United States Patent [19]

Klein

[11] Patent Number: 4,905,107

[45] Date of Patent: Feb. 27, 1990

[54] TORSION TRANSDUCER FOR MAGNETIC STORAGE DISK DRIVES

[76] Inventor: Enrique J. Klein, 1686 Christina Dr., Los Altos, Calif. 94022

[21] Appl. No.: 152,774

[22] Filed: Feb. 5, 1988

[51] Int. Cl.$^4$ .......................... G11B 5/55; G01L 3/10
[52] U.S. Cl. ..................................... 360/75; 360/77.03; 360/78.11; 310/333; 338/47; 318/646; 73/862.33; 73/862.35
[58] Field of Search ..................... 360/75, 77.03, 78.11, 360/105–109; 310/333; 338/47, 2, 5; 318/646, 652; 73/862.19, 862.32, 862.33, 862.35

[56] References Cited

U.S. PATENT DOCUMENTS

| 3,757,257 | 9/1973 | Knitter | 310/333 |
| 4,396,959 | 8/1983 | Harrison et al. | 360/77.08 |
| 4,652,786 | 3/1987 | Mishiro | 310/333 |

FOREIGN PATENT DOCUMENTS 60-102534  6/1985  Japan ................................ 73/862.35

Primary Examiner—Alan Faber
Assistant Examiner—Steven R. Garland
Attorney, Agent, or Firm—Rosenblum, Parish, Bacigalupi

[57] ABSTRACT

A torsion transducer for providing electrical position and angular velocity signals for a device driven in a bidirectional partial rotational mode, such as commonly found in the rotary actuator arm of a disc drive for rotating computer memories. The torsion transducer comprises a torsion bar in the form of a wire, with one end attached to the rotating element of the actuator arm and the other to a piezoelectric transducer operating in the shear mode, which is anchored to the stationary frame of the device. As the torsion bar is twisted by the angular motion of the rotary element, torque is applied to the piezoelectric transducer, which then generates an electrical signal that can be processed to represent position and angular velocity of the rotary elements of the actuator arm.

24 Claims, 3 Drawing Sheets

TORSION TRANSDUCER FOR MAGNETIC STORAGE DISK DRIVES

BACKGROUND OF THE INVENTION

1. Field of the Invention

The present invention relates generally to angular position and velocity sensors for devices having a limited angle of rotation, such as certain components of rotating computer memories and robot devices, and more particularly to a torsion transducer for use in conjunction with rotary actuator arms found in rotating computer memories.

2. Discussion of the Prior Art

Rigid magnetic disc drives having rotary actuator arms for positioning the read/write heads along an arc on the surface of the discs are usually powered by a voice coil motor of arcuate configuration, or by a stepper motor mechanically linked to the actuator arm. To make possible the accurate and rapid repositioning of the read/write heads over a desired circular track on the disc, or cylinder in the case of multiple discs, the drive motor of the rotary actuator arm must be carefully controlled. Voice coil motors are usually servo-controlled, wherein an accurate set of prerecorded circular concentric tracks, also called servo-tracks, on one or more of the disc surfaces provides feedback signals to the control circuitry through dedicated read/write heads. The principal function of servo tracks is to provide information for the precise positioning of the read/write heads over a predetermined data track. Additionally, the motion of the dedicated read/write head across the servo tracks while traveling to the desired position also provides signals that can be electronically processed to provide head position and velocity information which is then used to reposition the read/write head within the shortest possible time. A certain measure of this time is called access time. Another known means of obtaining position and velocity information, for the control of access time, is through the use of an encoder mounted between the rotary and the stationary portions of the actuator arm.

Typically, servo-controlled systems for a rotary actuator arm driven by a voice coil motor have the disadvantage of requiring at least one full disc surface dedicated to servo tracks, complex and expensive electronic control circuitry, and in some cases, expensive additional position and velocity sensing means, to provide adequate access time for the disc drive. A significant portion of the access time in such systems is the settling time required upon reaching a desired track position.

In the case where the rotary actuator arm is driven by a stepper motor, the re-positioning of the read/write heads is accomplished by control circuitry that keeps count of the steps travelled by the motor, while the settling time is managed by complex algorithms that control the end-point positioning of the stepper motor shaft. Such systems do not generally use servo-tracks on the discs and thus do not require servo-writing equipment or electronic control circuitry on the drive, nor do they give up space on the disc surface, that would otherwise be available for the storage of data. However, stepper motor driven rotary actuator arms have some limitations on access time due to the absence of feedback signals.

SUMMARY OF THE PRESENT INVENTION

It is therefore an object of the present invention to provide a torsion transducer capable of producing an electrical signal that can be processed into position and angular velocity indicators for the rotary actuator arm of a disc drive.

Another object of the present invention is to provide a torsion transducer that will occupy a minimal amount of space in a disc drive.

A further object of the present invention is to provide a torsion transducer that will provide for better management of access time on disc drives using voice coil and stepper motor powered actuator arms.

A still further object of the present invention is to provide a torsion transducer that will make possible the use of servo controls on disc drives having voice coil powered actuator arms and a smaller area of the disc surfaces dedicated to servo tracks.

Briefly, a preferred embodiment of the present invention includes a torsion bar in the form of a wire extended through the center of an actuator arm pivot shaft. One end of the wire is attached to the rotating element of a rotary actuator arm with a torsionally stiff but axially resilient coupling. The opposite end of the wire is attached to a torque plate, which is further attached to a piezoelectric transducer operating in the shear mode and anchored to the stationary frame of a disc drive. Any rotary motion by the rotating element of the actuator arm relative to the frame of the disc drive will twist the torsion bar and cause torque to be applied by the torque plate to the piezoelectric transducer, which then produces an electrical signal at the electrodes of the piezoelectric transducer proportional to the amount of torque applied to torque plate. This signal is further electronically processed into signals proportional to the angular position and angular velocity of the rotary actuator arm.

These and other objects of the present invention will no doubt become apparent to those skilled in the art after having read the following detailed disclosure of a preferred embodiment which is illustrated in the several figures of the drawing.

DETAILED DESCRIPTION OF THE INVENTION

Figure 1:
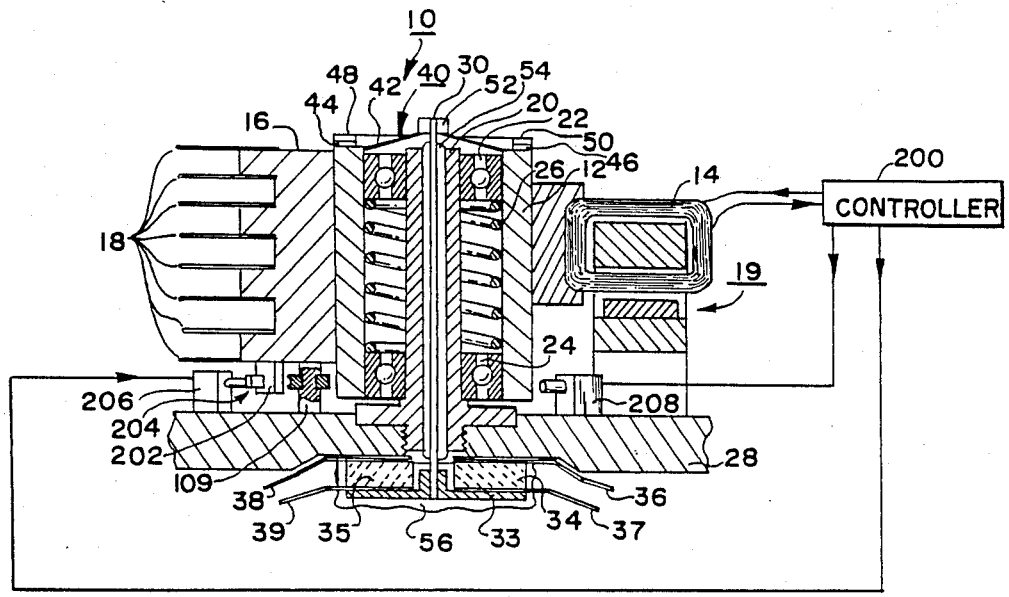
FIG. 1 is a cross-sectional view of a rotary actuator arm incorporating a torsion transducer in accordance with the preferred embodiment of the present invention.

Reference is now made to FIG. 1, which depicts a cross-sectional view of a rotary actuator arm and torsion transducer in accordance with the preferred embodiment of the present invention. The rotary actuator arm 10 consists essentially of a housing 12, fixedly attached to voice coil 14, which provides the driving torque for the actuator arm, and attached to E-block portion 16, which anchors a plurality of flexures 18 that are each adapted to carry a magnetic read/write head. A magnetic circuit assembly 19 (shown partly sectioned) provides magnetic flux for use in the operation of voice coil 14. Housing 12 rotates around a hollow pivot shaft 20 on two precision ball bearings 22 and 24. A preload spring 26 surrounds shaft 20 and provides a preloading force for the bearing system upon installation. Shaft 20 is fixedly attached to disc drive base plate 28 by means of a threading engagement. A brake 208 may be utilized to lock housing 12 against base plate 28 in any rotational position.

The torsion transducer portion of the rotary actuator arm 10 comprises mechanical and piezoelectric elements adapted to be integrally mounted with the rotary actuator while using a minimum of extra space within the disc drive. Torsion bar 30 is fixedly attached at one end to a torque plate 33. Torsion bar 30 is preferably made from a high tensile strength wire with a suitably long fatigue life under torsional stress. Piezoelectric transducers 34 and 35, having output terminal pairs 36, 37, and 38, 39, respectively, are affixed between torque plate 33 and disc drive base plate 28. A variety of different types of piezoelectric transducers can be utilized in place of transducers 34 and 35, as will be further discussed below.

The opposite end of torsion bar 30 is fixedly attached to a coupling member 40 adapted to rotate in fixed relationship with the rotary actuator arm housing 12. Coupling member 40 includes a disc spring 42 for supplying a tensile force to torsion bar 30. Two pairs of tabs 44 and 46 are located at the circumference of disc spring 42 and are adapted to be pressed into mating engagement with slots 48 and 50, in the actuator arm housing 12, as shown in FIG. 1. Upon a partial rotary motion of the actuator arm housing 12, relative to the stationary disc drive base plate 28, torsion bar 30 is twisted through the action of coupling member 40 against the restraint of base plate 28, through torque plate 33 and through shear force responsive piezoelectric transducers 34 and 35. Coupling member 40 also includes a hub 52, fixedly attached to the disc spring 42, to which torsion bar 30 is attached upon assembly.

A resilient damping substance 54 may be injected around torsion bar 30 to fill the cavity formed between hollow pivot shaft 20 and torsion bar 30. Alternatively, the surface of the torsion bar 30 may be coated with a resilient damping substance, having an appropriate viscoelastic characteristic. An encapsulating coating 56 is also provided around torque plate 33 and piezoelectric transducers 34 and 35 to seal the transducers from environmental influences, such as humidity, and at the same time sealing the HDA (Head-Disc Assembly) from contamination.

Figure 2:
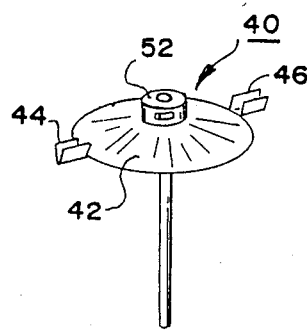
FIG. 2 is a perspective view of the coupling member between the torsion bar and the rotary actuator arm.

With reference to FIG. 2, coupling member 40 is more clearly shown with tabs 44 and 46 attached to disc spring 42. Torsion bar member 30 is extended through a central aperture in hub 52 of disc spring 42 and fixedly connected to hub 52. Hub 52 is integrally attached to disc spring 42 to provide a torsionally stiff but axially resilient coupling between torsion bar member 30 and rotary actuator arm 10.

Figure 3:
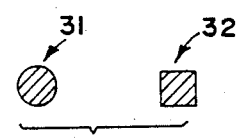
FIG. 3 is a view of two alternative cross-sections of the torsion bar.

Torsion bar 30 must be made from a suitable material and have an appropriate cross section to be capable of transmitting a torque or moment from housing 12 to the piezoelectric transducers 34 and 35. FIG. 3 shows two suitable cross-sectional shapes for torsion bar 30; a circular cross-section 31 and a square cross-section 32. Other considerations in the design of torsion bar 30 include: torsional strength; fatigue life; resonant frequencies; thermal expansion properties; and corrosion resistance.

For a torsion bar member of circular cross section, the equation for the moment is $$M = \frac{\pi d^4 G \alpha}{32 l} \quad (1)$$

and the shear stress is $$\tau = \frac{16 M}{\pi d^3} \quad (2)$$

wherein G is the material torsional modulus, $\tau$ is the shear stress, M is the moment, d is the diameter, l is the length, and $\alpha$ is the angle of rotation. Solving equation (1) for d results in $$d = \left( \frac{32 l M}{\pi G \alpha} \right)^{\frac{1}{4}} \quad (3)$$

which permits the computation of the torsion bar member diameter for a given geometry, material and desired output from piezoelectric transducers 34 and 35, which is a function of the moment M. Equation (2) then permits the verification of the material shear stress $\tau$, which must match, or be smaller than, the allowable shear stress for the chosen material, derated by the estimated fatigue life for the torsion bar, as is well known in the art of spring design.

Since the resonant frequencies of torsion bar 30 could interfere with the true output signal from the piezoelectric transducers 34 and 35, it is important to verify its values. The torsional resonant frequency for a torsion bar of uniform cross-section is calculated from the equation $$f_1 = \frac{1}{4l} \sqrt{\frac{Gg}{\rho}} \quad (4)$$

while the resonant frequency of such a torsion bar vibrating as a beam is given by $$f_2 = \frac{K_n d}{8\pi l^2} \sqrt{\frac{Eg}{\rho}} \quad (5)$$

wherein g is the acceleration due to gravity, $\rho$ is the density, E is Young's modulus of the material, and kn is a constant reflecting the type of end support for the beam.

An approximate computation using Equations (4) and (5) shows that for a one-third height disc drive, a steel torsion bar member of circular cross-section can be designed in which f1 becomes larger than 30 kHz and f2 becomes larger than 2 kHz. The results of Equations (4) and (5) for the torsional resonant frequency and the beam resonant frequency of torsion bar 30 will be affected to some extent by the axial and radial stiffness of coupling member 40, which is torsionally very stiff and axially less stiff.

As previously stated, torsion bar 30 is preferably made of a material having a high tensile and high torsional strength, such as a stainless steel spring material that will offer good corrosion resistance and high fatigue life together with a thermal expansion coefficient close to that of shaft 20. If the differential thermal expansion between the torsion bar 30 and shaft 20 are kept to a minimum, the axial preload on torsion bar 30 will be kept approximately constant.

Figure 4:
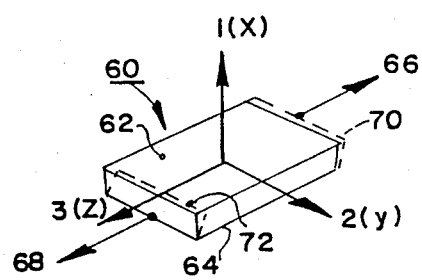
FIG. 4 is a perspective view of a piezoelectric shear plate shown to illustrate the operating principles of the transducer.

In FIG. 4, a piezoelectric shear plate 60 is represented by a parallelepiped body made from a material that displays or is made to display piezoelectric properties (also referred to as electrostrictive), such as barium titanate or lead zirconate-lead titanate combinations. Piezoelectric shear plate 60, which is shown poled along the 3(z) axis, is provided with electrodes 62 and 64 an opposite surfaces perpendicular to the 1(x) axis. When shear forces, represented by arrows 66 and 68, are applied to opposite surfaces of shear plate 60 around the 2(y) axis, a minute deformation of shear plate 60 will occur, as is shown by segmented lines at 70 and 72, and an electric charge, or voltage, will be produced between electroded surfaces 62 and 64. The piezoelectric constant for shear plates, g15, is a material constant which represents the electric field divided by the applied shear stress. It is important that some piezoelectric materials, when used in a shear plate mode as opposite to other operating modes, exhibit some of the highest values of the piezoelectric constant (g15 in this case), and of the corresponding electromechanical coupling coefficient k15 known to exist. Coefficient k15 represents the ability of the piezoelectric material to convert mechanical to electrical energy and vice-versa.

Figure 5:
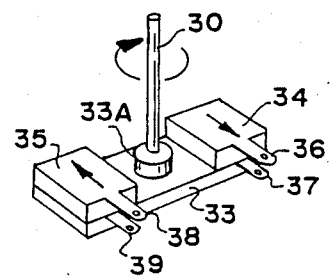
FIG. 5 is a perspective representation of a piezoelectric transducer arrangement in accordance with the preferred embodiment of the present invention.

In FIG. 5, a perspective representation of the piezoelectric transducers of the preferred embodiment of the present invention are shown. Piezoelectric shear plates 34 and 35, as previously described in FIG. 4, are fixedly mounted to the torque plate 33, which is torsionally driven by torsion bar 30. The charge on each shear plate is produced between terminal pairs 36, 37 for shear plate 34 and between terminal pairs 38, 39 for shear plate 35. When completing the assembly of the piezoelectric transducer it is preferable to electrically isolate electrodes 36, 37, 38, and 39 from torque plate 33 and disc drive base plate 28. In this manner, and with a known direction of poling for each shear plate, as shown by the arrows on shear plates 34 and 35, it becomes possible to either connect the two shear plates 34 and 35 through terminals 36, 37, 38, and 39 in series to obtain a larger charge output, or in parallel for improved electrical noise rejection.

Figure 6:
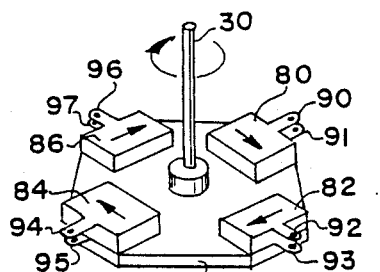
FIG. 6 is a perspective representation of a piezoelectric transducer arrangement in accordance with a first alternative embodiment of the present invention.

A first alternative embodiment of the piezoelectric transducer arrangement is shown in FIG. 6, wherein four piezoelectric shear plates 80, 82, 84, and 86 are fixedly mounted to the torque plate 88, which is torsionally driven by torsion bar 30. As in the embodiment of FIG. 5, by electrically isolating electrodes 90, 91, 92, 93, 94, 95, 96, and 97 from torque plate 88 and disc drive base plate 28, and installing shear plates 80, 82, 84, and 86 with known poling directions as indicated by the arrows, it becomes possible to either connect all four shear plates in series, all four in parallel, two parallel pairs in series, or two series pairs in parallel.

One piece annular shaped piezoelectric transducers are also known in the art. Such transducers require special poling techniques, as is disclosed in U.S. Pat. No. 3,757,257 issued to Knitter on Sept. 4, 1973, in order to create two or more independent shear plate elements within a one-piece annular shaped piezoelectric transducer. A similar poling technique is taught in U.S. Pat. No. 4,652,786 issued to Mishiro on Mar. 24, 1987. The several embodiments of Mishiro show an annular transducer incorporating an even number of two to six independent shear plate elements with an equal number of discrete operational electrodes on one of its flat surfaces, and a single operational electrode on the opposite surface. The present invention can make use of a transducer as disclosed by Mishiro, but having an even number of independent shear plate elements with twice the number of operational electrodes arranged in matching pairs on opposite flat surfaces of the annular piezoelectric transducer.

Figure 7:
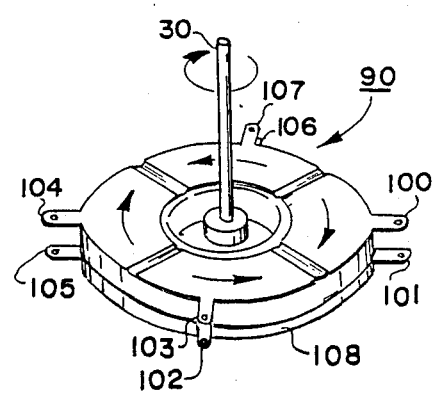
FIG. 7 is a perspective representation of a piezoelectric transducer arrangement in accordance with a second alternative embodiment of the present invention.

Accordingly, FIG. 7 shows a second alternative embodiment of the piezoelectric transducer arrangement shown in FIG. 5. An annular piezoelectric transducer 90 is shown incorporating four independent shear plate elements with four discrete pairs of operational poles on opposite flat surfaces of the transducer, terminated by electrode pairs 100, 101 and 102, 103 and 104, 105 and 106, 107. Annular piezoelectric transducer 90 is fixedly mounted to torque plate 108, which is torsionally driven by torsion bar 30. The charge developed in each shear plate element is then independently available between electrode pairs 100, 101 and 102, 103 and 104, 105 and 106, 107 and with known poling directions, as indicated by the arrows, it becomes possible to connect all four shear plate elements in series, all four in parallel, two parallel pairs in series, or two series pairs in parallel.

The transducer described in the preferred embodiment of the present invention, having piezoelectric elements operating in the shear mode, may also be configured to function using piezoelectric elements operating in the thickness compression/expansion mode. The transducer may also be configured to function using sensing elements operating according to other principles of physics, such as piezoresistors.

Figure 8:
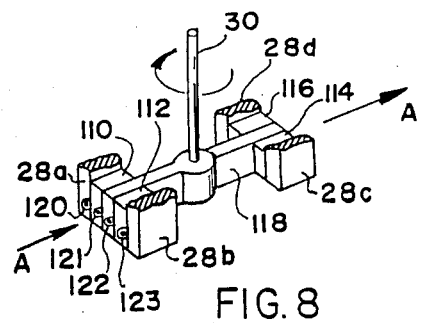
FIG. 8 is a perspective representation of a piezoelectric transducer arrangement in accordance with a third alternative embodiment of the present invention.
Figure 8A:
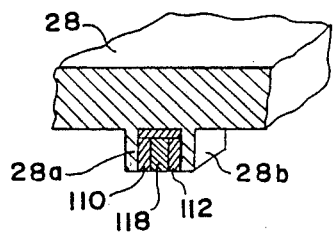
FIG. 8A is a perspective partial cross-sectional view of the transducer arrangement of FIG. 8 when viewed along the line A—A.

FIG. 8 shows a third alternative embodiment of the transducer arrangement shown in FIG. 5. Piezoelectric elements 110, 112, 114 and 116, which are poled to operate in the thickness compression/expansion mode, are fixedly mounted to torque paddle 118, which is torsionally driven by torsion bar 30. The transducer assembly of torque paddle 118 and piezoelectric elements 110, 112, 114 and 116 is rigidly constrained by the disc drive base plate 28 (not shown) through base plate protrusions 28a, 28b, 28c and 28d. FIG. 8A shows a perspective cross-sectional view of the transducer arrangement of FIG. 8 along the line A—A. A portion of base plate 28 is shown with base plate protrusions 28a and 28b forming walls on the sides of piezoelectric elements 110 and 112 with torque paddle 118 sandwiched inbetween.

Piezoelectric elements 110, 112, 114 and 116 are preferably electrically isolated from torque paddle 118 and base plate protrusions 28a, 28b, 28c and 28d. If the piezoelectric elements are electrically isolated, charges induced in the piezoelectric elements by compression and expansion of the elements, due to the force applied by the torque paddle, can be obtained at terminal pairs 120, 121 and 122, 123 or at similar terminals (not shown), on the other end of paddle 118. Therefore, for a given directional torque of torque paddle 118, and known direction of poling for each piezoelectric element (perpendicular to their electroded mounted surfaces), elements 110, 112, 114 and 116 can all be connected in series, in parallel, as two parallel pairs in series, or as two series pairs in parallel.

While the embodiment of this invention described in FIG. 8 refers to the sensing elements as piezoelectric elements operating in the thickness compression/expansion mode, the sensing elements may also be replaced by other types of sensing elements, such as piezoresistors.

Signal processing circuitry appropriately adapted to be used with piezoelectric elements will process electrical charges or voltages. Likewise, other signal processing circuitry used in conjunction with piezoresistive elements will process electrical currents modified by the piezoresistivity of the sensing elements.

The theory and implementation of piezoelectricity as well as a number of piezoelectric devices, some suitable for use in connection with the present invention, are described in two publications of the Vernitron Piezoelectric Division, 232 Forbes Road, Bedford, Ohio, 44146: "Piezoelectric Technology Data For Designers" and "Modern Piezoelectric Ceramics".

It should be noted that while any of a number of different currently available force and torque sensors may be coupled to torsion bar 30, such sensors would generally have fewer advantages over the sensors described above.

The assembly of a torsion transducer in a rotary actuator arm is next described with reference back to FIG. 1. A piezoelectric transducer arrangement, such as shown in FIGS. 5, 6, 7 or 8, can be considered as a subassembly. Using the piezoelectric transducer arrangement of FIG. 5 in this example, piezoelectric transducers 34 and 35 are fixedly attached to torque plate 33 and torsion bar 30 is fixedly attached to a boss 33A (shown more clearly in FIG. 5), which forms an integral part of torque plate 33. This piezoelectric transducer subassembly is then inserted into rotary access arm 10 through shaft 20 and adhered to disc drive base plate 28 using an electrically non-conductive cement in order to electrically isolate terminals 36 and 38 from the disc drive, while providing a fixed mechanical attachment of the transducer subassembly to the disc drive base. Coupling member 40 is then engaged with the rotary actuator arm housing 12 by means of tabs 44 and 46, while the central aperture in hub 52 slides freely over an extension of torsion bar 30 (not shown). After choosing an appropriate angular engagement position of housing 12 relative to the disc drive base, and injecting resilient damping substance 54 between torsion bar 30 and hollow pivot shaft 20, disc spring 42 is compressed towards the base casting with a desired force. Hub 52 is then fixedly attached to torsion bar 30, preferably using crimping techniques, thus completing the assembly of the torsion transducer in the rotary actuator arm.

Depending on the chosen angular engagement position of the rotary actuator arm housing 12 relative to the disc drive base plate 28, the actuator arm 10 can be positioned so that the read/write heads are at the center track, the outermost track, or the innermost track, with the torsion bar being under no torsional strain at one of those particular positions. The angular engagement position of housing 12, relative to base plate 28, can also be set so that actuator arm 10 is always torsionally biased by torsion bar 30 against a mechanical stop pin 109. This arrangement allows the magnetic heads and actuator arm 10 to be positioned over a given parking zone, preferably just beyond the innermost track of the disc, where the actuator arm may be secured in place by a latch 204. Latch 204 pivots around mechanical stop pin 109 and latches onto a rigid extension 202 of E-block portion 16 when the magnetic heads are positioned over the parking zone. If the disc drive loses power, or is not energized, latch 204 maintains actuator arm 10 captive so as to prevent the magnetic heads from moving across the surface of the discs and causing damage. When the disc drive is energized, a latch release 206 temporarily activates and causes latch 204 to disengage rigid extension 202.

The movement of actuator arm 10 is controlled by controller 200, which supplies current to voice coil 14, causing it to move housing 12. Controller 200 also actuates brake 208 and latch release 206. Latch 204 is mechanical and comes into operation when the actuator arm 10 is moved into the parking zone, either by command of controller 200 or the torsional biasing of torsion bar 30 when the disc drive is de-energized. A similar arrangement may be utilized to prevent actuator arm 10 from moving too far beyond the outermost track.

The maximum angular motion of a rotary actuator arm 10 is typically 20 degrees of arc. Thus, depending on the chosen position of zero torsional strain, the torsion bar can experience a maximum torsional angle from about 10 degrees bidirectionally, to 20 degrees unidirectionally. While the actuator arm drive must be able to provide the additional torque to overcome the torque required to twist the torsion bar 30 and hold it in a given position momentarily, some of the expended energy will be recovered on the return stroke, since the torsion bar 30 is also a torsion spring capable of storing and releasing potential energy.

Since an expenditure of energy needed to maintain the actuator arm on track against the torque of the torsion bar 30 is generally undesirable, the brake 29, which can be of a type that requires only a temporary energy pulse to brake or release, can be temporarily energized to lock the actuator arm housing 12 against the disc drive base plate 28, and thereby allow the voice coil 14 to be de-energized. When a new seek is demanded, the brake 29 is again temporarily energized and thus released, and so the actuator arm is again free to rotate. It should also be noted that the angular motion of the torsion bar 30 is substantially larger than that of the piezoelectric transducers which can be measured in a few seconds of arc.

As the rotary actuator arm 10 is driven to a new position, a torque is applied through the torsion bar to the piezoelectric transducers and a charge or voltage will be produced at the electrode pairs as described earlier. This charge will be proportional to torque and therefore to the angular position of the actuator arm relative to a previous position. An angular velocity signal can then be obtained by differentiating the angular position signal with respect to time.

Figure 9:
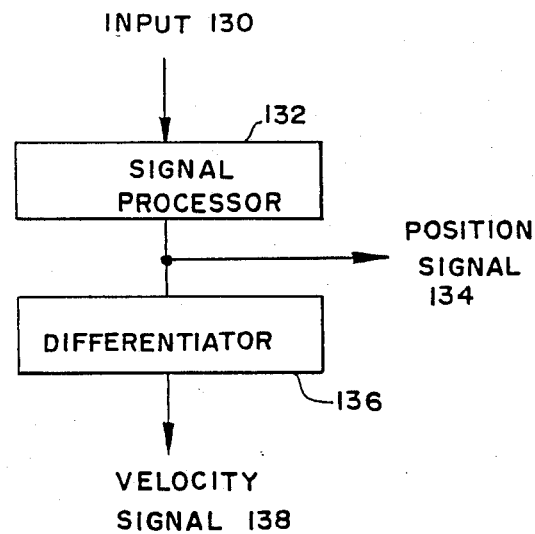
FIG. 9 is a block diagram representing an electronic signal processing circuit capable of providing signals proportional to the angular position and the angular velocity of a rotary actuator arm.

A block diagram representing an electronic signal processing circuit capable of providing both an angular position and an angular velocity signal is shown in FIG. 9. This circuit would be contained within a portion of controller 200. An input signal 130 is derived, in the case of the preferred embodiment of FIG. 5, from terminal pairs 36, 37 and 38, 39, which are connected in a parallel or series arrangement. Input signal 130 is then electronically processed in Signal Processor 132 from which an angular Position Signal 134 ensues. The Position Signal 134 is then further electronically processed in Differentiator 136 resulting in an angular Velocity Signal 138.

It is anticipated that other embodiments and/or alterations or modifications of the present invention will become apparent to those skilled in the art after having read this disclosure. Accordingly, it is intended that the following claims be interpreted to cover all such alterations, alternatives or modifications as fall within the true spirit and scope of the invention.

I claim:

1. A torsion transducer for use in rigid disc drives having magnetic heads positioned by a rotary actuator including a stationary support post having a central bore forming a passageway extending longitudinally therethrough and affixed to a base of the disc drive, said base having an aperture aligned with said passageway, and a rotary element journalled to said stationary support post for moving the magnetic heads, said torsion transducer comprising:
   a torsion bar extending through said passageway and said aperture;
   connector means attached to one end of said torsion bar for coupling said torsion bar to said rotary element; and
   transducer means coupled to the other end of said torsion bar for detecting torque developed in said torsion bar when said rotary element is rotated and for producing electrical signals proportional to said torque.

2. A torsion transducer as recited in claim 1, and further comprising a processing means for receiving said electrical signals and producing a corresponding angular position signal proportional to an angular position of said rotary element and a corresponding angular velocity signal proportional to an angular velocity of said rotary element.

3. A torsion transducer as recited in claim 2, wherein said processing means includes:
   means responsive to said electrical signals and operative to develop said angular position signal; and
   differentiating means responsive to said angular position signal and operative to differentiate said angular position signal and develop said angular velocity signal.

4. A torsion transducer as recited in claim 1, wherein said connector means includes a disc spring having a central portion affixed to said one end of said torsion bar and having at least one point on its circumference affixed to said rotary element, said disc spring exerting a predetermined tensile force on said torsion bar, thereby providing a torsionally stiff but axially resilient coupling between said torsion bar and said rotary element.

5. A torsion transducer as recited in claim 1, wherein said torsion bar is vibrationally damped by a damping substance surrounding said torsion bar.

6. A torsion transducer as recited in claim 1, wherein said torsion bar is a wire having a circular cross-section.

7. A torsion transducer as recited in claim 1, wherein said torsion bar is a wire having a non-circular cross-section.

8. A torsion transducer as recited in claim 1, wherein said transducer means includes a piezoelectric device.

9. A torsion transducer as recited in claim 8, wherein said piezoelectric device includes at least two shear plates.

10. A torsion transducer as recited in claim 8, wherein said piezoelectric device is an annular piezoelectric device having an even number of shear plate elements with an equal number of electrically isolated electrode pairs attached to opposing planar surfaces thereof.

11. A torsion transducer as recited in claim 1, wherein said transducer means includes a piezoresistive device.

12. A torsion transducer as recited in claim 1, wherein said transducer means is encapsulated by a coating for protecting it from environmental influences.

13. A torsion transducer as recited in claim 1, wherein said base further includes at least one stop pin for engaging a portion of said rotary element and preventing said rotary element from moving said magnetic heads beyond a predetermined position, and wherein said torsion bar is torsionally preloaded to rotate said rotary element in a first direction toward said stop pin when said rotary actuator is not energized.

14. A torsion transducer for use in rigid disc drives having magnetic heads positioned by a rotary actuator including a stationary support post having a central bore forming a passageway extending longitudinally therethrough and affixed to a base of the disc drive, said base having an aperture aligned with said passageway, and a rotary element journalled to said stationary support post for moving the magnetic heads, said torsion transducer comprising:
   a torsion bar extending through said passageway and said aperture;
   connector means fixedly attached to one end of said torsion bar for coupling said torsion bar to said rotary element, said connector means being adapted to rotate in fixed relationship with said rotary element; and
   transducer means connected to said base and the other end of said torsion bar for detecting torque applied thereto by said torsion bar when said rotary element rotates and for producing electrical signals proportional to detectable changes in said torque.

15. A torsion transducer as recited in claim 14, and further comprising processing means for gauging said electrically detectable changes and producing an angular position signal and an angular velocity signal respectively proportional to an angular position and an angular velocity of said rotary element.

16. A torsion transducer as recited in claim 15, wherein said processing means includes:
   means for gauging said electrically detectable changes and producing said angular position signal; and
   differentiating means for receiving said angular position signal and differentiating said angular position signal to produce said angular velocity signal.

17. A torsion transducer as recited in claim 14, wherein said connector means includes a disc spring having a central portion affixed to said one end of said torsion bar and having at least one point on its circumference affixed to said rotary element, said disc spring exerting a predetermined tensile force on said torsion bar, thereby providing a torsionally stiff but axially resilient coupling between said torsion bar and said rotary element.

18. A torsion transducer as recited in claim 14, wherein said torsion bar is a wire having a circular cross-section.

19. A torsion transducer as recited in claim 14, wherein said torsion bar is a wire having a non-circular cross-section.

20. A torsion transducer as recited in claim 14, wherein said torsion bar is vibrationally damped by a damping substance surrounding said torsion bar.

21. A torsion transducer as recited in claim 14, wherein said base further includes at least one stop pin for engaging a portion of said rotary element and preventing said rotary element from moving said magnetic heads beyond a predetermined position, and wherein said torsion bar is torsionally preloaded to rotate said rotary element in a first direction toward said stop pin when said rotary actuator is not energized.

22. A torsion transducer as recited in claim 14, wherein said transducer means is encapsulated to protect it from environmental influences.

23. A torsion transducer as reicted in claim 14, wherein said transducer means includes a piezoelectric device.

24. A torsion transducer as recited in claim 14, wherein said transducer means includes a piezoresistive device.

* * * * *